(12) United States Patent
Zinner

(10) Patent No.: US 9,981,560 B2
(45) Date of Patent: May 29, 2018

(54) PREDICTIVE METHOD FOR OPERATING A VEHICLE AND CORRESPONDING DRIVER ASSISTANCE SYSTEM FOR A VEHICLE

(71) Applicant: Continental Automotive GmbH, Hannover (DE)

(72) Inventor: Helge Zinner, Magdeburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 144 days.

(21) Appl. No.: 15/028,424

(22) PCT Filed: Sep. 29, 2014

(86) PCT No.: PCT/EP2014/070777
§ 371 (c)(1),
(2) Date: Apr. 9, 2016

(87) PCT Pub. No.: WO2015/052027
PCT Pub. Date: Apr. 16, 2015

(65) Prior Publication Data
US 2016/0243945 A1    Aug. 25, 2016

(30) Foreign Application Priority Data

Oct. 10, 2013   (DE) ........................ 10 2013 220 426

(51) Int. Cl.
*B60W 30/00*    (2006.01)
*B60L 7/18*    (2006.01)
(Continued)

(52) U.S. Cl.
CPC ............. *B60L 7/18* (2013.01); *B60L 11/1861* (2013.01); *B60L 15/2009* (2013.01);
(Continued)

(58) Field of Classification Search
None
See application file for complete search history.

(56) References Cited

U.S. PATENT DOCUMENTS 6,381,522 B1 * 4/2002 Watanabe ................ B60K 6/48
180/65.25
6,487,477 B1 * 11/2002 Woestman ............. B60K 6/365
180/65.235
(Continued)

FOREIGN PATENT DOCUMENTS

CN    101954870 A    1/2011    ............... B60K 6/20
CN    102897155 A    1/2013    ............... B60L 7/26
(Continued)

OTHER PUBLICATIONS

German Office Action, Application No. 102013220426.4, 5 pages, dated Jul. 21, 2014.
(Continued)

*Primary Examiner* — Jonathan M Dager
(74) *Attorney, Agent, or Firm* — Slayden Grubert Beard PLLC

(57) ABSTRACT

A method for controlling operation of a vehicle with a recuperation unit may include determining at least one first parameter denoting possible imminent actuation of the recuperation unit, evaluating whether actuation of the recuperation unit is imminent, and if yes, calculating a probable profile for a speed of the vehicle during the actuation on the basis of a prescribable level of a recuperation intensity of the recuperation unit. The method may also include generating at least one second parameter denoting the ascertained probable profile of the speed of the vehicle during the ascertained imminent actuation of the recuperation unit and displaying the at least one second parameter with an output apparatus.

14 Claims, 4 Drawing Sheets

(51) Int. Cl.
*B60W 30/18* (2012.01)
*B60W 40/105* (2012.01)
*B60W 20/14* (2016.01)
*B60L 11/18* (2006.01)
*B60L 15/20* (2006.01)
*B60W 50/14* (2012.01)

(52) U.S. Cl.
CPC ......... *B60L 15/2045* (2013.01); *B60W 20/14* (2016.01); *B60W 30/18109* (2013.01); *B60W 40/105* (2013.01); *B60L 2240/68* (2013.01); *B60L 2250/16* (2013.01); *B60L 2250/28* (2013.01); *B60L 2260/50* (2013.01); *B60W 30/18127* (2013.01); *B60W 2050/146* (2013.01); *B60W 2530/10* (2013.01); *B60W 2530/16* (2013.01); *B60W 2540/12* (2013.01); *B60W 2550/143* (2013.01); *B60W 2550/22* (2013.01); *B60W 2550/402* (2013.01); *Y02T 10/7258* (2013.01)

(56) References Cited

U.S. PATENT DOCUMENTS

| | | | | |
|---|---|---|---|---|
| 7,769,499 B2* | 8/2010 | McQuade | | G07C 5/008 701/1 |
| 7,849,944 B2* | 12/2010 | DeVault | | B60K 6/365 180/65.265 |
| 7,898,405 B2* | 3/2011 | Burke | | G01D 11/28 180/65.21 |
| 7,993,243 B2* | 8/2011 | Silveri | | B60K 6/52 477/125 |
| 8,116,971 B2* | 2/2012 | Chen | | G01C 21/3469 340/439 |
| 8,260,481 B2* | 9/2012 | Naik | | B60K 6/365 701/22 |
| 8,374,740 B2* | 2/2013 | Druenert | | B60K 6/48 180/65.275 |
| 8,401,733 B2* | 3/2013 | Weslati | | B60W 50/085 701/36 |
| 8,428,804 B2* | 4/2013 | Sakai | | B60L 7/16 180/65.28 |
| 8,433,473 B2* | 4/2013 | Perkins | | B60K 35/00 701/32.1 |
| 8,565,952 B2* | 10/2013 | Mehr | | B60L 11/00 180/65.265 |
| 8,583,343 B2* | 11/2013 | Yamada | | B60K 6/46 701/521 |
| 8,600,672 B2* | 12/2013 | Hidaka | | B60K 6/48 701/22 |
| 8,606,513 B2* | 12/2013 | Chen | | B60L 11/14 701/22 |
| 8,612,082 B2* | 12/2013 | Hashimoto | | G01C 21/3469 701/1 |
| 8,615,350 B2 | 12/2013 | Goto et al. | | 701/70 |
| 8,688,344 B2 | 4/2014 | Remlinger | | 701/70 |
| 8,725,331 B2* | 5/2014 | Yoshida | | B60L 11/1842 701/22 |
| 8,849,485 B2* | 9/2014 | Christ | | B60L 1/003 180/65.275 |
| 8,855,844 B2* | 10/2014 | Schwindt | | B60K 31/0008 701/22 |
| 8,935,090 B2* | 1/2015 | Mineta | | B60W 50/0097 700/123 |
| 9,008,858 B1* | 4/2015 | Payne | | B60H 1/00771 701/1 |
| 9,045,126 B2* | 6/2015 | Harty | | B60W 10/06 |
| 9,227,626 B2* | 1/2016 | Pandit | | B60K 1/00 |
| 9,266,529 B2* | 2/2016 | Dufford | | B60W 20/40 |
| 9,440,654 B2* | 9/2016 | Atluri | | B60W 10/06 |
| 9,440,655 B2* | 9/2016 | Roos | | B60W 30/182 |
| 9,452,758 B2* | 9/2016 | Choi | | B60R 16/0236 |
| 9,457,668 B2* | 10/2016 | Matsuda | | B62K 11/04 |
| 9,527,389 B2* | 12/2016 | Huh | | B60L 7/18 |
| 2005/0228553 A1* | 10/2005 | Tryon | | B60K 6/46 701/22 |
| 2006/0005736 A1* | 1/2006 | Kumar | | B60L 11/1801 105/1.4 |
| 2006/0278449 A1* | 12/2006 | Torre-Bueno | | B60K 6/46 180/65.29 |
| 2007/0010933 A1* | 1/2007 | Hochkirchen | | B60W 10/26 701/117 |
| 2007/0112475 A1* | 5/2007 | Koebler | | B60L 3/12 701/1 |
| 2007/0176762 A1* | 8/2007 | Aoyagi | | B60L 11/18 340/439 |
| 2007/0208467 A1* | 9/2007 | Maguire | | B60K 6/48 701/22 |
| 2007/0208468 A1* | 9/2007 | Sankaran | | B60K 6/445 701/31.4 |
| 2007/0295544 A1* | 12/2007 | Borroni-Bird | | B60K 35/00 180/165 |
| 2008/0119982 A1* | 5/2008 | Yamada | | B60L 3/12 701/33.4 |
| 2008/0215201 A1* | 9/2008 | Okubo | | B60K 6/365 701/22 |
| 2009/0066495 A1* | 3/2009 | Newhouse | | B60W 20/00 340/439 |
| 2009/0118887 A1* | 5/2009 | Minarcin | | B60K 6/365 701/22 |
| 2009/0157267 A1* | 6/2009 | Shin | | B60W 50/0098 701/51 |
| 2009/0234528 A1* | 9/2009 | Crombez | | G07C 5/004 701/31.4 |
| 2009/0259363 A1* | 10/2009 | Li | | B60K 6/445 701/36 |
| 2009/0288896 A1* | 11/2009 | Ichikawa | | B60K 6/365 180/65.265 |
| 2010/0030413 A1* | 2/2010 | Jinno | | B60K 6/445 701/22 |
| 2010/0057281 A1* | 3/2010 | Lawyer | | G01D 7/02 701/22 |
| 2010/0121514 A1* | 5/2010 | Kato | | B60K 6/48 701/22 |
| 2010/0161166 A1* | 6/2010 | Yamada | | B60K 6/46 701/22 |
| 2010/0211240 A1* | 8/2010 | Crombez | | B60W 10/08 701/22 |
| 2010/0228459 A1* | 9/2010 | Mizuno | | B60K 35/00 701/70 |
| 2010/0305799 A1* | 12/2010 | Yamada | | B60K 6/46 701/22 |
| 2011/0022255 A1* | 1/2011 | Yamada | | B60K 6/46 701/22 |
| 2011/0023772 A1* | 2/2011 | Crombez | | B60K 6/445 116/28 R |
| 2011/0029168 A1* | 2/2011 | Talberg | | B60K 6/48 701/22 |
| 2011/0029184 A1* | 2/2011 | Brighenti | | B60W 30/0953 701/31.4 |
| 2011/0040438 A1* | 2/2011 | Kluge | | G01C 21/3469 701/31.4 |
| 2011/0066308 A1* | 3/2011 | Yang | | B60W 10/06 701/22 |
| 2011/0082632 A1* | 4/2011 | Rowker | | B60K 35/00 701/70 |
| 2011/0095878 A1* | 4/2011 | Skaff | | B60K 6/445 340/441 |
| 2011/0153175 A1* | 6/2011 | Zhang | | B60W 40/09 701/70 |
| 2011/0160946 A1* | 6/2011 | Wilde | | B60W 10/06 701/22 |
| 2011/0166732 A1* | 7/2011 | Yu | | B60W 10/26 701/22 |
| 2011/0184642 A1* | 7/2011 | Rotz | | G01C 21/3469 701/533 |
| 2011/0202216 A1* | 8/2011 | Thai-Tang | | B60W 10/08 701/22 |

(56) References Cited

U.S. PATENT DOCUMENTS

| | | | | |
|---|---|---|---|---|
| 2011/0205044 A1* | 8/2011 | Enomoto | | B60K 35/00 340/439 |
| 2011/0210838 A1* | 9/2011 | Fujiki | | G07C 5/0816 340/439 |
| 2011/0227715 A1* | 9/2011 | Gee | | B60K 6/365 340/439 |
| 2011/0238457 A1* | 9/2011 | Mason | | G01C 21/3469 705/7.14 |
| 2011/0241864 A1* | 10/2011 | Fujiki | | B60K 35/00 340/439 |
| 2011/0246012 A1* | 10/2011 | McClain | | B60L 7/18 701/22 |
| 2011/0307166 A1* | 12/2011 | Hiestermann | | G01C 21/32 701/119 |
| 2011/0313647 A1* | 12/2011 | Koehler | | B60L 15/2045 701/123 |
| 2011/0320088 A1* | 12/2011 | Eom | | B60K 35/00 701/34.4 |
| 2012/0010767 A1* | 1/2012 | Phillips | | G01C 21/3469 701/22 |
| 2012/0035795 A1* | 2/2012 | Yu | | B60W 50/0097 701/22 |
| 2012/0078468 A1* | 3/2012 | Popp | | B60K 26/021 701/36 |
| 2012/0078496 A1* | 3/2012 | Lindhuber | | B60K 35/00 701/123 |
| 2012/0143410 A1* | 6/2012 | Gallagher | | B60L 11/1861 701/22 |
| 2012/0176231 A1* | 7/2012 | Skaff | | B60K 35/00 340/439 |
| 2012/0179346 A1* | 7/2012 | Aldighieri | | B60T 1/10 701/70 |
| 2012/0179395 A1* | 7/2012 | Gilman | | B60L 11/1861 702/61 |
| 2012/0179420 A1* | 7/2012 | Gilman | | B60K 35/00 702/165 |
| 2013/0049945 A1* | 2/2013 | Crombez | | B60T 1/10 340/453 |
| 2013/0066493 A1* | 3/2013 | Martin | | B60W 20/00 701/22 |
| 2013/0144501 A1* | 6/2013 | Yang | | B60W 50/14 701/93 |
| 2013/0173128 A1* | 7/2013 | Syed | | B60R 16/02 701/70 |
| 2013/0274958 A1* | 10/2013 | Uno | | B60W 20/00 701/1 |
| 2014/0032087 A1* | 1/2014 | Shiri | | G06F 17/00 701/117 |
| 2014/0172208 A1* | 6/2014 | Limbacher | | F01B 7/16 701/22 |
| 2014/0195116 A1* | 7/2014 | Hrovat | | B60W 10/06 701/38 |
| 2014/0277835 A1* | 9/2014 | Filev | | G01C 21/3469 701/2 |
| 2015/0046070 A1* | 2/2015 | Awadi | | F02D 17/04 701/112 |
| 2015/0298680 A1* | 10/2015 | Matthews | | B60W 20/00 701/22 |
| 2016/0267726 A1* | 9/2016 | Soo | | G07C 5/06 |

FOREIGN PATENT DOCUMENTS

| | | | | |
|---|---|---|---|---|
| DE | 102008015046 A1 | 9/2008 | | B60W 20/00 |
| DE | 102010027730 A1 | 10/2011 | | B60W 20/00 |
| DE | 102010048103 A1 | 4/2012 | | B60L 7/18 |
| DE | 102011011345 A1 | 8/2012 | | B60L 7/18 |
| DE | 102011116314 A1 | 4/2013 | | B60K 35/00 |
| JP | 2004120877 A | 4/2004 | | F02D 29/06 |
| JP | 2011066957 A | 3/2011 | | F02D 29/06 |
| WO | 2012/095964 A1 | 7/2012 | | B60W 40/08 |
| WO | 2015/052027 A1 | 4/2015 | | B60W 20/00 |

OTHER PUBLICATIONS

International Search Report and Written Opinion, Application No. PCT/EP2014/070777, 18 pages, dated Dec. 22, 2014.

Chinese Office Action, Application No. 201480055677.3, 14 pages, dated Sep. 4, 2017.

\* cited by examiner

PREDICTIVE METHOD FOR OPERATING A VEHICLE AND CORRESPONDING DRIVER ASSISTANCE SYSTEM FOR A VEHICLE

CROSS-REFERENCE TO RELATED APPLICATIONS

This application is a U.S. National Stage application of International Application No. PCT/EP2014/070777 filed Sep. 29, 2014, which designates the United States of America, and claims priority to DE Application No. 10 2013 220 426.4 filed Oct. 10, 2013, the contents of which are hereby incorporated by reference in their entirety.

TECHNICAL FIELD

The present disclosure relates to a method for operating a vehicle, and more specifically to a driver assistance systems and methods for a vehicle.

BACKGROUND

DE 10 2010 048 103 A1 discloses a method for recuperating kinetic energy from a motor vehicle to optimize based on energy, wherein the method comprises the existence of at least one predetermined condition during the journey of the motor vehicle prompting the ascertainment of an optimum braking distance in respect of recuperable energy, and generation of a signal for the vehicle driver that notifies him, in respect of at least one measure for or while braking the motor vehicle, of the form in which said measure needs to be performed so that braking takes place over the optimum braking distance.

SUMMARY

The teachings of the present disclosure may allow further improved operation of the vehicle.

A method for operating a vehicle, wherein the vehicle has a recuperation unit designed to recuperate kinetic energy from the vehicle and an output apparatus designed to output driving information, has—in some embodiments—the following steps. Ascertainment of at least one first parameter denoting possible imminent actuation of the recuperation unit is effected. In addition, ascertainment of whether actuation of the recuperation unit is imminent, on the basis of the at least one ascertained first parameter, is effected. If it is ascertained that actuation of the recuperation unit is imminent, ascertainment of a probable profile for a speed of the vehicle during the ascertained imminent actuation of the recuperation unit on the basis of a prescribable level of a recuperation intensity of the recuperation unit during the ascertained imminent actuation of the recuperation unit is effected. In addition, output of at least one second parameter, denoting the ascertained probable profile of the speed of the vehicle during the ascertained imminent actuation of the recuperation unit, by means of the output apparatus is effected.

In some embodiments, the method allows further improved operation of the vehicle. This is effected particularly by virtue of the ascertainment of whether actuation of the recuperation unit is imminent, the ascertainment of a probable profile for the speed of the vehicle during the ascertained imminent actuation of the recuperation unit on the basis of the prescribable level of the recuperation intensity of the recuperation unit and the output of the at least one second parameter, denoting the ascertained probable profile of the speed of the vehicle, by means of the output apparatus. This is based on the consideration that actuation of the recuperation unit leads to the braking of the vehicle, which varies depending on the level of the recuperation intensity of the recuperation unit.

Some embodiments can be used to ascertain the probable profile of the speed of the vehicle during the imminent actuation of the recuperation unit. In addition, the occupants of the vehicle, particularly the driver of the vehicle, can be provided with information about the ascertained probable profile of the speed by virtue of the output of the at least one second parameter. As a result, the driver of the vehicle can adjust the driving behavior in a further improved manner to suit the respective instantaneous driving situation.

Some embodiments of the method additionally involve ascertainment of a probable braking path for the vehicle during the ascertained imminent actuation of the recuperation unit on the basis of the prescribable level of the recuperation intensity of the recuperation unit during the ascertained imminent actuation of the recuperation unit. Furthermore, the method involves output of at least one third parameter, denoting the ascertained probable braking path of the vehicle during the ascertained imminent actuation of the recuperation unit, by means of the output apparatus. As a result, the occupants of the vehicle, particularly the driver of the vehicle, can, in said driving situation, additionally be provided with information about the ascertained probable braking path of the vehicle, for example the length thereof, and the driver of the vehicle can therefore react to the respective driving situation to a further improved extent.

The ascertainment of the probable braking path of the vehicle may particularly involve ascertainment of a distance within which the speed of the vehicle falls below a predetermined threshold value during the ascertained imminent actuation of the recuperation unit. As a result, the driver of the vehicle can, on the basis of the predetermined threshold value, be provided with information about the distance after which the vehicle, during the actuation of the recuperation unit, comes to a standstill, travels at walking speed or reaches a minimum speed, for example, before recuperation is effected.

Some embodiments additionally involve ascertainment of at least one operating parameter for an energy storage apparatus for storing energy recuperated by means of the recuperation unit. In such embodiments, the ascertainment of the probable profile of the speed of the vehicle during the ascertained imminent actuation of the recuperation unit is additionally effected on the basis of the at least one ascertained operating parameter. This is based on the consideration that the level of the recuperation intensity of the recuperation unit can vary on the basis of the respective instantaneous operating state of the energy storage apparatus. The ascertainment of the at least one operating parameter of the energy storage apparatus allows such variation in the recuperation intensity as a result of a corresponding selection of the prescribable level of the recuperation intensity to be advantageously taken into account for the ascertainment of the probable profile of the speed of the vehicle.

In addition, ascertainment of at least one fourth parameter, selected from the group consisting of an instantaneous mass of the vehicle, an instantaneous tire pressure of at least one tire of the vehicle and an instantaneous attitude of a chassis of the vehicle, can be effected. In some embodiments, the ascertainment of the probable profile of the speed of the vehicle during the ascertained imminent actuation of the recuperation unit is additionally effected on the basis of the at least one ascertained fourth parameter. The cited parameters typically have an influence on the braking behavior of the vehicle, which influence can be taken into account for the ascertainment of the probable profile of the speed of the vehicle.

Some embodiments additionally involve ascertainment of a route profile and/or of an instantaneous road condition of a road on which the vehicle is traveling. The ascertainment of the probable profile of the speed of the vehicle during the ascertained imminent actuation of the recuperation unit may be additionally effected on the basis of the ascertained route profile and/or the ascertained instantaneous road condition. This is again based on the consideration that the cited parameters have an influence on the braking behavior of the vehicle. These embodiments therefore allow further improved ascertainment of the probable profile of the speed of the vehicle.

The ascertainment of the route profile of the road on which the vehicle is traveling can involve particularly ascertainment of a gradient or slope of the road. The ascertainment of the instantaneous road condition of the road on which the vehicle is traveling can involve ascertainment of a parameter denoting an instantaneous coefficient of friction of the road, for example. Said parameter may be reduced on the basis of instantaneous ambient conditions, particularly on the basis of an instantaneous weather condition in the region of the surroundings of the vehicle, for example on the basis of rain, snow or black ice.

The ascertainment of the probable profile of the speed of the vehicle during the ascertained imminent actuation of the recuperation unit can involve ascertainment of a plurality of probable profiles for the speed of the vehicle on the basis of a plurality of different recuperation intensities of the recuperation unit during the ascertained imminent actuation of the recuperation unit. As already explained, the level of the recuperation intensity of the recuperation unit can vary. This can be advantageously taken into account in the cited embodiment. Hence, the driver of the vehicle can be provided with information about different speed profiles of the vehicle during the ascertained imminent recuperation mode.

Some embodiments additionally involve ascertainment of a probable profile of an acceleration of the vehicle, a rate of change of the speed of the vehicle over time, during the ascertained imminent actuation of the recuperation unit on the basis of the prescribable level of the recuperation intensity of the recuperation unit during the ascertained imminent actuation of the recuperation unit. In addition, the method may involve output of at least one fifth parameter, denoting the ascertained probable profile of the acceleration of the vehicle during the ascertained imminent actuation of the recuperation unit, by means of the output apparatus. As a result, the occupants of the vehicle, particularly the driver of the vehicle, can, in the cited driving situation, additionally be provided with information about the ascertained probable acceleration or braking behavior of the vehicle, and the driver of the vehicle can therefore react to the respective driving situation to a further improved extent.

In some embodiments, the ascertained probable profile of the speed of the vehicle is transmitted to at least one driver assistance system of the vehicle and/or to at least one further vehicle. As a result, the operation of the driver assistance system can be adjusted to suit the respective ascertained probable profile of the speed of the vehicle, or further road users can be provided with information about the probable profile of the speed of the vehicle. In addition, the ascertained probable braking path of the vehicle and/or the ascertained probable profile of the acceleration of the vehicle during the ascertained imminent actuation of the recuperation unit can be transmitted to the at least one driver assistance system of the vehicle and/or to the at least one further vehicle.

In some embodiments, the ascertainment of the at least one first parameter involves ascertainment of traffic regulations that apply in a region of instantaneous surroundings of the vehicle. As a result, it is a simple matter to ascertain whether braking of the vehicle and associated actuation of the recuperation unit are imminent.

The ascertainment of traffic regulations that apply in a region of the instantaneous surroundings of the vehicle can include ascertainment of at least one traffic regulation, selected from the group consisting of a speed limit, a traffic priority rule and a switching phase of a light signal installation. The cited traffic regulations are of particular significance for whether braking of the vehicle as a result of actuation of the recuperation unit is imminent.

In addition, it is possible to ascertain whether the traffic regulation can probably be observed as a result of sole actuation of the recuperation unit or whether this requires manual braking, for example, additional braking by the driver of the vehicle, and/or an increase in recuperation power or an increase in the level of the recuperation intensity of the recuperation unit.

In addition, the ascertainment of traffic regulations that apply in a region of the instantaneous surroundings of the vehicle can be effected on the basis of data ascertained by at least one sensor of the vehicle, for example, on the basis of images taken by at least one optical camera of the vehicle, and/or on the basis of data received by at least one communication unit of the vehicle, such as data received by a radio reception unit, a mobile radio reception unit, a vehicle-to-vehicle communication unit and/or a vehicle-to-infrastructure communication unit, and/or on the basis of map data stored in the memory apparatus. This allows reliable ascertainment of the traffic regulations that apply in the region of the instantaneous surroundings of the vehicle. The memory apparatus may be part of a navigation system, particularly a navigation system of the vehicle itself. In addition, the memory apparatus may be a memory apparatus external to the vehicle. The memory apparatus external to the vehicle is part of a server in this case, for example. As a result, the map data can be provided in a form that is as up to date as possible.

In some embodiments, the ascertainment of the at least one first parameter involves ascertainment of a degree of depression of a gas pedal of the vehicle. As a result, it is a simple matter to ascertain whether actuation of the recuperation unit is imminent.

Some embodiments may include a computer program product having a computer-readable medium and program code that is stored on the computer-readable medium and that, when executed on a computation unit, instructs the computation unit to carry out a method according to one of the cited embodiments.

Some embodiments may include a driver assistance system for a vehicle. The driver assistance system has an output apparatus that is designed to output driving information. In addition, the driver assistance system has a computation unit and a computer program product according to the embodiment cited above.

The computer program product and the driver assistance system have the advantages already cited in connection with the corresponding method, and these advantages will not be explained again at this juncture in order to avoid repetition.

The output apparatus may particularly have a head-up display. As a result, the driver of the vehicle can be provided with information about the ascertained probable profile of the speed of the vehicle during the ascertained imminent actuation of the recuperation unit without this involving the driver averting his gaze from the instantaneous events for a driver.

In the embodiments described above, the vehicle may be a motor vehicle, for example an automobile or a truck, the motor vehicle typically being in the form of an electric vehicle or in the form of a hybrid vehicle.

BRIEF DESCRIPTION OF THE DRAWINGS

Example embodiments of the teachings of the present disclosure will now be explained in more detail with reference to the appended figures.

DETAILED DESCRIPTION

Figure 1:
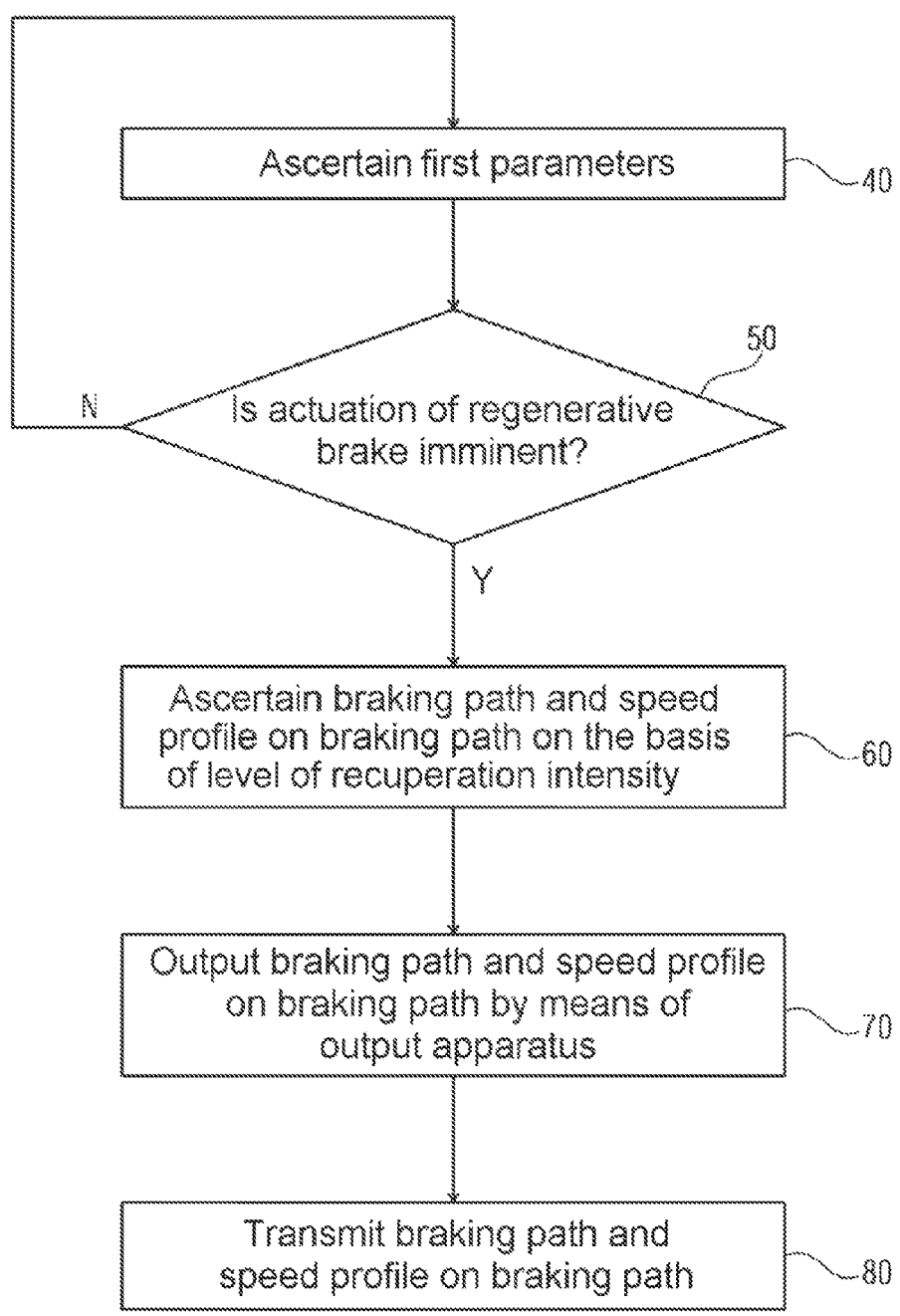
FIG. 1 shows a flowchart for a method for operating a vehicle in one embodiment.

FIG. 1 shows a flowchart for a method for operating a vehicle in one embodiment. The vehicle has a recuperation unit that is designed to recuperate kinetic energy from the vehicle, for example a regenerative brake in the form of an electric drive motor of the vehicle that is operated as a generator. In addition, the vehicle has an output apparatus that is designed to output driving information. The output apparatus is preferably in the form of a visual output apparatus, for example in the form of a head-up display of the vehicle. Typically, the vehicle is a motor vehicle, such as an automobile or a truck. The motor vehicle may particularly be in the form of an electric vehicle or in the form of a hybrid vehicle.

A step 40 involves, during a driving mode of the vehicle, ascertainment of at least one first parameter denoting possible imminent actuation of the recuperation unit.

By way of example, the ascertainment of the at least one first parameter may involve ascertainment of traffic regulations that apply in a region of instantaneous surroundings of the vehicle, particularly ascertainment of at least one traffic regulation, selected from the group consisting of a speed limit, a traffic priority rule and a switching phase of a light signal installation.

In this case, the ascertainment of traffic regulations that apply in a region of the instantaneous surroundings of the vehicle can be effected on the basis of data ascertained by at least one sensor of the vehicle, particularly on the basis of images taken by at least one optical camera of the vehicle, and/or on the basis of data received by at least one communication unit of the vehicle, particularly on the basis of data received by a radio reception unit, a mobile radio reception unit, a vehicle-to-vehicle communication unit and/or a vehicle-to-infrastructure communication unit, and/or on the basis of map data stored in the memory apparatus.

In addition, the ascertainment of the at least one first parameter can involve ascertainment of a degree of depression of a gas pedal of the vehicle.

A step 50 involves taking the at least one first parameter ascertained in step 40 as a basis for ascertaining whether actuation of the recuperation unit is imminent. By way of example, imminent actuation of the recuperation unit can be ascertained if a speed limit is ascertained in the region of surroundings lying ahead of the vehicle and an instantaneous speed of the vehicle exceeds the value of the ascertained speed limit. Furthermore, imminent actuation of the recuperation unit can be ascertained if an instantaneous speed of the vehicle exceeds a speed that is appropriate for traveling on a route section lying ahead of the vehicle, for example an imminent curve. In addition, imminent actuation of the recuperation unit can be ascertained if a light signal installation, for example a traffic light installation, situated in the region of the surroundings lying ahead of the vehicle outputs a stop order phase for the vehicle. In addition, imminent actuation of the recuperation unit can be ascertained if release of the gas pedal is ascertained. If step 50 involves the ascertainment that actuation of the recuperation unit is not imminent, steps 40 and 50 are carried out as a repeat.

If, by contrast, step 50 involves the ascertainment that actuation of the recuperation unit is imminent, then a step 60 involves ascertainment of a probable braking path for the vehicle during the ascertained imminent actuation of the recuperation unit and of a probable profile of a speed and of an acceleration of the vehicle on the ascertained braking path of the vehicle on the basis of a prescribable level of a recuperation intensity of the recuperation unit during the ascertained imminent actuation of the recuperation unit. By way of example, the prescribable level of the recuperation intensity of the recuperation unit corresponds to a recuperation intensity that recuperates a maximum quantity of energy.

The ascertainment of the probable braking path of the vehicle can particularly involve ascertainment of a distance within which the speed of the vehicle during the ascertained imminent actuation of the recuperation unit falls below a predetermined threshold value, for example 6 km/h.

The ascertainment of the probable braking path of the vehicle and of the probable profile of the speed and also of the acceleration of the vehicle during the ascertained imminent actuation of the recuperation unit can additionally be effected on the basis of at least one ascertained operating parameter of an energy storage apparatus for storing energy recuperated by means of the recuperation unit. By way of example, if the energy storage apparatus is in the form of a storage battery, then it is possible for an instantaneous temperature and/or an instantaneous state of charge of the storage battery to be ascertained and for a value for the prescribable level of the recuperation intensity of the recuperation unit during the ascertained imminent actuation of the recuperation unit to be determined therefrom.

In addition, the ascertainment of the probable braking path of the vehicle and of the probable profile of the speed and also of the acceleration of the vehicle during the ascertained imminent actuation of the recuperation unit can additionally be effected on the basis of an ascertained instantaneous mass of the vehicle, an ascertained instantaneous tire pressure of at least one tire of the vehicle and/or an ascertained instantaneous attitude of a chassis of the vehicle.

In addition, the ascertainment of the probable braking path of the vehicle and of the probable profile of the speed and also of the acceleration of the vehicle during the ascertained imminent actuation of the recuperation unit can additionally be effected on the basis of an ascertained route profile and/or an ascertained instantaneous road condition of a road on which the vehicle is traveling.

A step 70 involves output of at least one second parameter, denoting the ascertained probable profile of the speed of the vehicle during the ascertained imminent actuation of the recuperation unit, a third parameter, denoting the ascertained probable braking path of the vehicle during the ascertained imminent actuation of the recuperation unit, and a fifth parameter, denoting the ascertained probable profile of the acceleration of the vehicle during the ascertained imminent actuation of the recuperation unit, by means of the output apparatus.

In addition, in the embodiment shown, a step 80 involves transmission of the ascertained probable profile of the speed and of the acceleration of the vehicle and also of the ascertained probable braking path of the vehicle to at least one driver assistance system of the vehicle and/or to at least one further vehicle.

The embodiments described above are therefore used to output, for example to display, both the probable speed and the probable remaining path of the vehicle during the recuperation. These data can be made available to the driver and in the vehicle, or to the surroundings thereof, for example. In particular, these data can be presented in a head-up display and laid directly on the road image, and/or overlaid with the road image. Hence, the driver can directly identify what distance, for example in meters, the vehicle will still cover if it continues to recuperate without interruption.

As a result of capture of relevant environmental data, such as gradient of the road, condition, coordinates, for example, and of relevant vehicle data, such as current speed, mass, tire pressure and recuperation power, it is possible to predict the speed of the vehicle for the next few meters.

As a result of the ascertainment of the probable recuperation path, not only is it possible for the driver to be advised of an optimum recuperation starting time, it is also possible for the data to be made available to the vehicle if the vehicle has an autonomous or semiautonomous driving mode of operation. The vehicle can then begin recuperative braking at the recuperation starting time.

In this case, the aforementioned sensors of the vehicle recognize when stopping or braking will be necessary, for example at a junction or set of traffic lights, at an entrance to a village or an imminent speed limit.

This recognition is possible by means of radar and/or camera sensors and/or GPS data, particularly navigation data, for example. Both the driver and the vehicle, if said vehicle is driving in automated fashion, receive an output indicating when the optimum time for recuperation will be, at which the greatest possible amount of energy can be supplied. In this case, the head-up display, for example, is used to display the starting time, at which the driver or the vehicle will demand no more drive power for the vehicle and recuperation is begun. This can be accomplished by means of a bar display with an associated speed, for example, and additionally or alternatively be presented in color, with a presentation in red denoting a high speed and a presentation in green denoting an idling mode, for example.

Further presentation options, which can also be combined, are audible signals, a numerical presentation in the head-up display and/or vibration of the gas pedal or buildup of a boosted back pressure, and/or a display in a combined instrument of the vehicle by means of graphical representations.

The driver can also be notified in a purely audible manner, for example by a "gong", and by virtue of a light flashing.

The provision of such a display can motivate the driver firstly in favor of recuperation technology and awareness of recuperation. By way of example, this means that the driver can recognize whether his vehicle is still rolling toward a red set of traffic lights at an appropriate speed or whether he needs to depress the gas pedal again. This means that it is possible to prevent a needless demand for drive power for the vehicle, for example.

The display can therefore be used to optimize the recuperation power, since it is thereby made clear to the driver when the vehicle comes to a standstill or continues to travel just at a walking pace.

As a result, it is additionally possible for the driver to recognize whether he has to brake or whether his vehicle is coming to a standstill exclusively by virtue of the recuperation. This means that it is again possible for a maximum amount of energy to be supplied to the energy storage apparatus, for example a vehicle battery, and for wear on the vehicle brake and also on the tires of the vehicle to be reduced when the driver recognizes that even light braking is not absolutely necessary.

In addition, the direct incorporation of the remaining range during recuperation into the head-up display affords interference-free and constantly visible perception.

Figure 2:
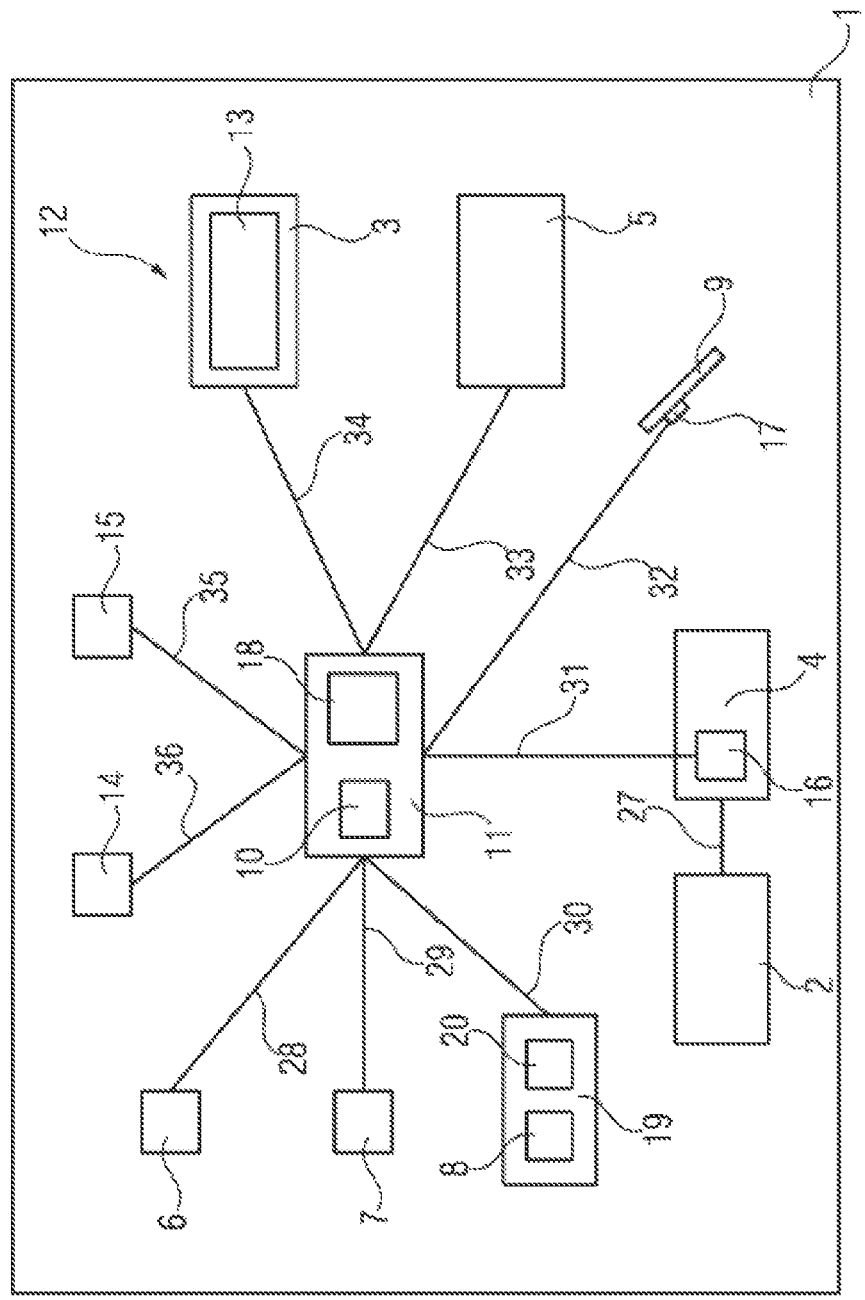
FIG. 2 shows a driver assistance system for a vehicle in one embodiment.

FIG. 2 shows a driver assistance system 12 for a vehicle 1 in one embodiment. In the embodiment shown, the vehicle 1 is a motor vehicle in the form of an automobile. For reasons of clarity, the vehicle 1 and the further components are presented schematically in FIG. 2.

The vehicle 1 has a recuperation unit 2 that is designed to recuperate kinetic energy from the vehicle 1. By way of example, the recuperation unit 2 is in the form of a regenerative brake in the form of an electric drive motor of the vehicle 1 that is operated as a generator. In addition, the vehicle 1 has an energy storage apparatus 4, for example at least one storage battery or at least one capacitor, for storing energy recuperated by means of the recuperation unit 2. The energy storage apparatus 4 is additionally connected to the recuperation unit 2 by means of a connecting element 27.

The driver assistance system 12 has an output apparatus 3 that is designed to output driving information. In the embodiment shown, the output apparatus 3 is in the form of a visual output apparatus. To this end, the output apparatus 3 has a head-up display 13.

Furthermore, the driver assistance system 12 has a computation unit 11. The computation unit 11 has a computer-readable medium 10 and a processing unit 18. By way of example, the processing unit 18 may be in the form of an electronic processor, particularly in the form of a microprocessor or microcontroller. By way of example, the computer-readable medium 10 may be in the form of an EEPROM, flash memory or flash EEPROM or NVRAM. The computer-readable medium 10 stores program code that, when executed on the computation unit 11, instructs the computation unit 11 to carry out the aforementioned embodiments of the method for operating the vehicle 1, particularly the embodiment shown in FIG. 1. In this case, the computation unit 11 is designed particularly to ascertain a probable braking path for the vehicle 1 during ascertained imminent actuation of the recuperation unit 2 and also a probable profile of a speed and of an acceleration of the vehicle 1 on the ascertained braking path of the vehicle 1 on the basis of a prescribable level of a recuperation intensity of the recuperation unit 2 during the ascertained imminent actuation of the recuperation unit 2.

To this end, the computation unit 11 is connected to at least one sensor 6 of the vehicle 1 via a signal line 28. By way of example, the at least one sensor 6 is in the form of an optical camera. In addition, the computation unit 11 is connected to at least one communication unit 7 of the vehicle 1 via a signal line 29. By way of example, the communication unit 7 is in the form of a radio reception unit, mobile radio reception unit, vehicle-to-vehicle communication unit and/or vehicle-to-infrastructure communication unit of the vehicle 1. In addition, the computation unit 11 is connected to a navigation system 19 of the vehicle 1 via a signal line 30. The navigation system 19 has a memory apparatus 8 with map data stored thereon and also a satellite-aided position finding apparatus 20. As a result, it is possible to ascertain traffic regulations that apply in a region of instantaneous surroundings of the vehicle 1 on the basis of data ascertained by the at least one sensor 6, on the basis of data received by the at least one communication unit 7 and/or on the basis of map data stored in the memory apparatus 8, and to infer imminent actuation of the recuperation unit 2 therefrom. In addition, it is possible to infer imminent actuation of the recuperation unit 2 if braking of a further vehicle traveling ahead of the vehicle is ascertained on the basis of data ascertained by the at least one sensor 6 and/or on the basis of data received by the at least one communication unit 7.

In addition, the computation unit 11 is connected, via a signal line 32, to a sensor 17 that is designed to ascertain a degree of depression of a gas pedal 9 of the vehicle 1. As a result, it is possible to infer imminent actuation of the recuperation unit 2 if the gas pedal 9 is released.

Furthermore, the computation unit 11 is connected, via a signal line 31, to at least one sensor 16 that is designed to ascertain at least one operating parameter of the energy storage apparatus 4. By way of example, the at least one sensor 16 is designed to ascertain an instantaneous temperature and/or an instantaneous state of charge of the energy storage apparatus 4. As a result, the ascertainment of the probable braking path of the vehicle 1 and of the probable profile of the speed and also of the acceleration of the vehicle 1 during the ascertained imminent actuation of the recuperation unit 2 can additionally be effected on the basis of the at least one ascertained operating parameter of the energy storage apparatus 4.

The computation unit 11 is additionally connected, via a signal line 35, to a sensor 15 that is designed to ascertain an instantaneous speed of the vehicle 1. Furthermore, the computation unit 11 is connected, via a signal line 36, to at least one sensor 14 that is designed to ascertain an instantaneous tire pressure of tires of the vehicle 1, which are not shown in more detail in FIG. 2. As a result, the ascertainment of the probable braking path of the vehicle 1 and of the probable profile of the speed and also of the acceleration of the vehicle 1 during the ascertained imminent actuation of the recuperation unit 2 can additionally be effected on the basis of the ascertained instantaneous speed of the vehicle 1 and also the ascertained instantaneous tire pressure of the tires of the vehicle 1.

The computation unit 11 is additionally designed to output at least one second parameter, denoting the ascertained probable profile of the speed of the vehicle 1 during the ascertained imminent actuation of the recuperation unit 2, a third parameter, denoting the ascertained probable braking path of the vehicle 1 during the ascertained imminent actuation of the recuperation unit 2, and a fifth parameter, denoting the ascertained probable profile of the acceleration of the vehicle 1 during the ascertained imminent actuation of the recuperation unit 2, by means of the output apparatus 3. To this end, the computation unit 11 is connected to the output apparatus 3 via a signal line 34. In addition, the computation unit 11 is designed to transmit the ascertained probable profile of the speed and of the acceleration of the vehicle 1 and also of the ascertained probable braking path of the vehicle 1 to at least one driver assistance system 5 of the vehicle 1. To this end, the computation unit 11 is connected to the at least one driver assistance system 5 via a signal line 33. In addition, the ascertained probable profile of the speed and of the acceleration and also of the ascertained probable braking path of the vehicle 1 can be transmitted to at least one further vehicle if the communication unit 7 is in the form of a vehicle-to-vehicle communication unit, for example.

Figure 3A:
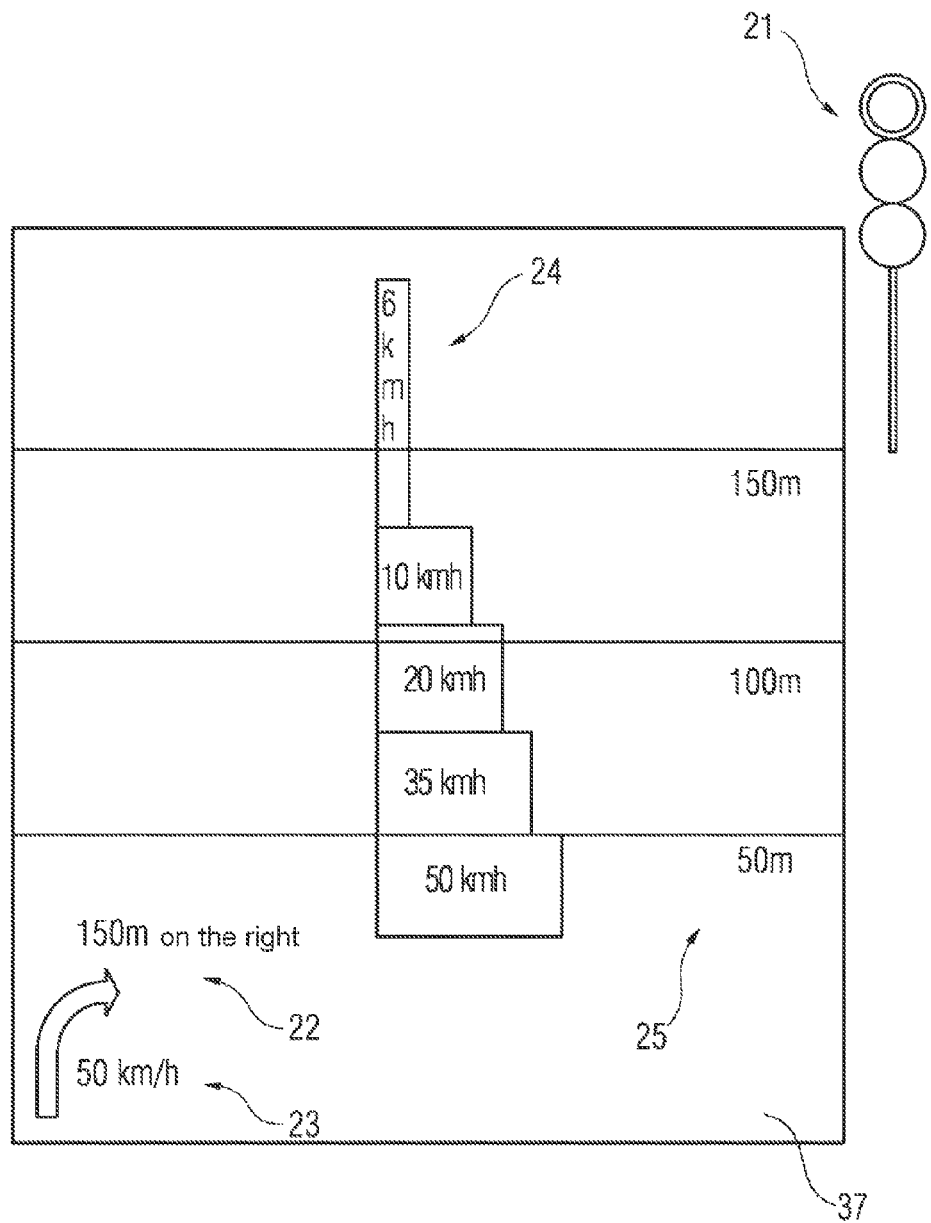
FIG. 3A shows driving information that is output by means of the output apparatus shown in FIG. 2 in a first representation.

FIG. 3A shows driving information that is output by means of the output apparatus presented in FIG. 2 in a first representation.

In this case, the driving information that is output by means of the head-up display of the output apparatus, which is shown in FIG. 2, contains a display 22 with a driving recommendation in the form of a turn recommendation and also a display 23 of an instantaneous speed of the vehicle.

In addition, the driving information that is output by means of the head-up display of the output apparatus contains a display 24 that denotes an ascertained probable profile of the speed of the vehicle during ascertained imminent actuation of the recuperation unit of the vehicle that is shown in FIG. 2. In the representation shown, the display 24 contains a bar representation of the ascertained probable profile of the speed of the vehicle. In this case, the speed bars represent the predicted speed that the vehicle will probably have at different positions if recuperation is effected without interruption.

Furthermore, the output apparatus is used to output a display 25 that denotes an ascertained probable braking path of the vehicle during the ascertained imminent actuation of the recuperation unit. To this end, in the representation shown, the display 25 is used to output a plurality of distance values that indicate the respective distance from the instantaneous position of the vehicle. As presented in FIG. 3A, the speed decreases with distance covered, until the vehicle either comes to a standstill or achieves an "idling mode".

The displays 24 and 25 can provide the driver of the vehicle with information by means of which the driver can initiate a braking process for the vehicle by virtue of actuation of the recuperation unit such that the vehicle essentially comes to a standstill in front of a light signal installation 21, which is arranged in the region of surroundings lying ahead of the vehicle, if the light signal installation 21 currently outputs a stop order phase for the vehicle, as shown in FIG. 3A.

In this case, the displays 22, 23, 24 and 25 are output by means of the head-up display of the output apparatus such that they overlie a region of a road 37, lying ahead of the vehicle, that is visible through a windshield of the vehicle, which is not shown in more detail.

Figure 3B:
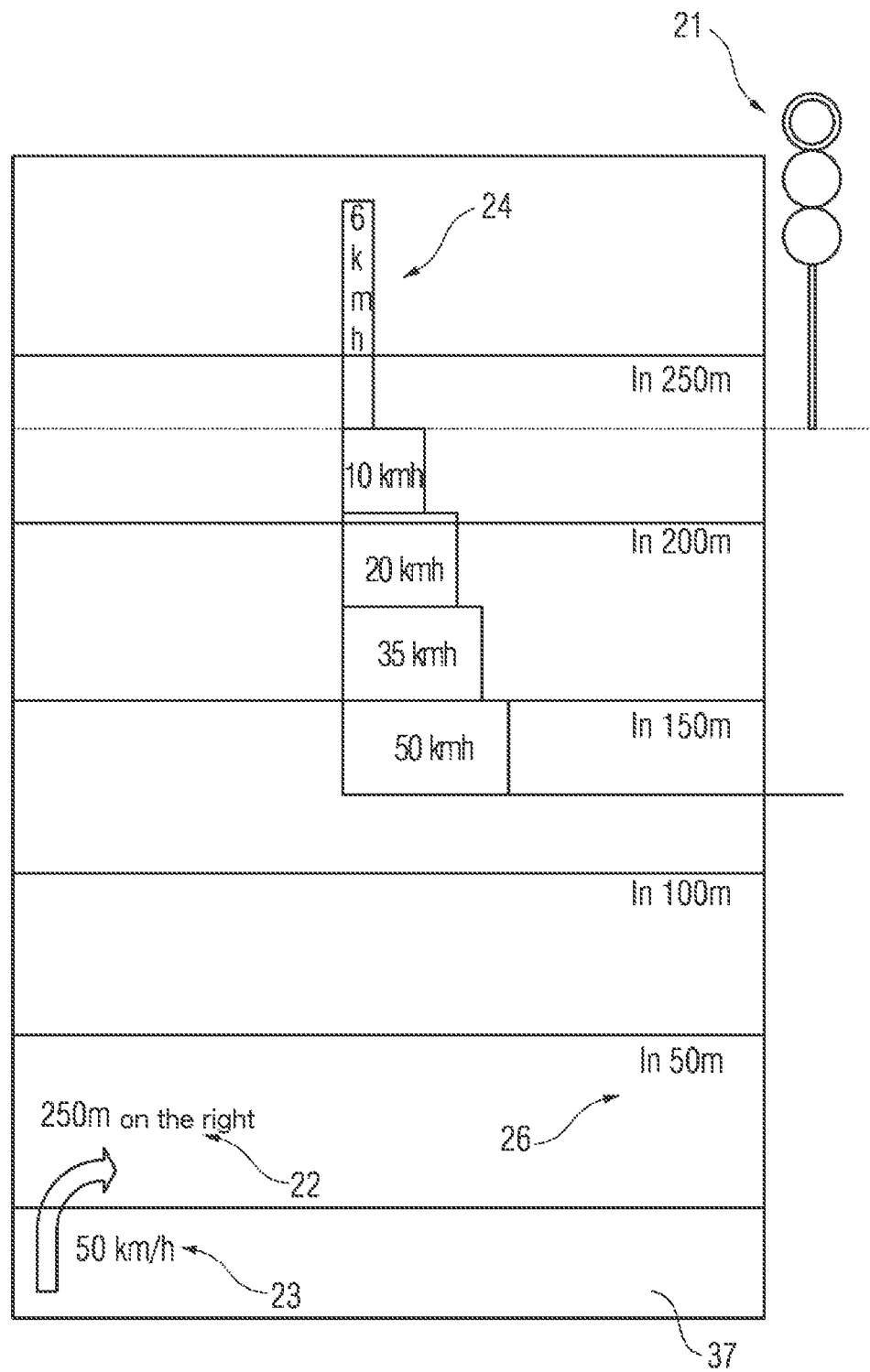
FIG. 3B shows driving information that is output by means of the output apparatus shown in FIG. 2 in a second representation.

FIG. 3B shows driving information that is output by means of the output apparatus presented in FIG. 2 in a second representation. Components having the same functions as in FIG. 3A are denoted by the same reference symbols and not explained again below.

The second representation shown in FIG. 3B differs from the first representation shown in FIG. 3A in that the head-up display of the output apparatus is used to output a display 26 by means of which, as explained above, a suitable time is presented for the driver of the vehicle, at which the recuperation needs to begin in order for the vehicle essentially to come to a standstill in front of the light signal installation 21. The speed of the vehicle at the beginning of the recuperation process and also the distance of the position at which the recuperation process begins from the instantaneous position of the vehicle are denoted in FIG. 3B by means of a dot-dash line. In addition, the speed of the vehicle on termination of the recuperation process and also the distance of the position at which the recuperation process ends from the instantaneous position of the vehicle are denoted in FIG. 3B by means of a dotted line. In this case, the recuperation process ends, in the representation shown, when the speed of the vehicle falls below a threshold value of 6 km/h.

LIST OF REFERENCE SYMBOLS

1 Vehicle
2 Recuperation unit
3 Output apparatus
4 Energy storage apparatus
5 Driver assistance system
6 Sensor
7 Communication unit
8 Memory apparatus
9 Gas pedal
10 Medium
11 Computation unit
12 Driver assistance system
13 Head-up display
14-17 Sensor
18 Processing unit
19 Navigation system
20 Position finding apparatus
21 Light signal installation
22-26 Display
27 Connecting element
28-35 Signal line
37 Road
40-80 Step

What is claimed is:

1. A method for operating a vehicle, wherein the vehicle has a recuperation unit to recuperate kinetic energy from the vehicle and an output apparatus to output driving information and wherein the method comprises the following steps:
determining at least one first parameter denoting possible imminent actuation of the recuperation unit,
evaluating whether actuation of the recuperation unit is imminent, on the basis of the at least one ascertained first parameter,
if it is ascertained that actuation of the recuperation unit is imminent, calculating a probable profile for a speed of the vehicle during the ascertained imminent actuation of the recuperation unit on the basis of a prescribable level of a recuperation intensity of the recuperation unit during the ascertained imminent actuation of the recuperation unit,
generating at least one second parameter denoting the ascertained probable profile of the speed of the vehicle during the ascertained imminent actuation of the recuperation unit,
determining a probable braking path for the vehicle during the ascertained imminent actuation of the recuperation unit on the basis of the prescribable level of the recuperation intensity of the recuperation unit during the ascertained imminent actuation of the recuperation unit;
generating at least one third parameter, denoting the ascertained probable braking path of the vehicle during the ascertained imminent actuation of the recuperation unit; and displaying the at least one second parameter and the at least one third parameter with the output apparatus.

2. The method as claimed in claim 1, wherein determining the probable braking path of the vehicle involves ascertainment of a distance within which the speed of the vehicle falls below a predetermined threshold value during the ascertained imminent actuation of the recuperation unit.

3. The method as claimed in claim 1, further comprising determining at least one operating parameter for an energy storage apparatus for storing energy recuperated by means of the recuperation unit, and
wherein generating the at least one second parameter is additionally effected on the basis of the at least one ascertained operating parameter.

4. The method as claimed in claim 1, further comprising determining at least one fourth parameter, selected from the group consisting of an instantaneous mass of the vehicle, an instantaneous tire pressure of at least one tire of the vehicle and an instantaneous attitude of a chassis of the vehicle, and
wherein generating the at least one second parameter is additionally effected on the basis of the at least one ascertained fourth parameter.

5. The method as claimed in claim 1, further comprising determining a route profile and/or an instantaneous road condition of a road on which the vehicle is traveling, and
wherein the at least one second parameter is additionally effected on the basis of the ascertained route profile and/or the ascertained instantaneous road condition.

6. The method as claimed in claim 1, wherein the at least one second parameter depends at least in part on a plurality of probable profiles for the speed of the vehicle determined on the basis of a plurality of different recuperation intensities of the recuperation unit during the ascertained imminent actuation of the recuperation unit.

7. The method as claimed in claim 1, wherein the at least one second parameter is transmitted to at least one driver assistance system of the vehicle and/or to at least one further vehicle.

8. The method as claimed in claim 1, wherein the at least one first parameter depends at least in part on traffic regulations that apply in a region of instantaneous surroundings of the vehicle.

9. The method as claimed in claim 8, wherein the traffic regulations include at least one traffic regulation, selected from the group consisting of a speed limit, a traffic priority rule, and a switching phase of a light signal installation.

10. The method as claimed in claim 8, the traffic regulations are based at least in part on data ascertained by at least one sensor of the vehicle and/or data received by at least one communication unit of the vehicle and/or on map data stored in the memory apparatus.

11. The method as claimed in claim 1, wherein the at least one first parameter depends at least in part on a degree of depression of a gas pedal of the vehicle.

12. A computer program product including a non-transitory computer-readable medium and program code stored on the computer-readable medium, when executed on a computation unit, instructs the computation unit to:
determine at least one first parameter denoting possible imminent actuation of the recuperation unit,
evaluate whether actuation of the recuperation unit is imminent, on the basis of the at least one ascertained first parameter,
if it is ascertained that actuation of the recuperation unit is imminent, calculate a probable profile for a speed of the vehicle during the ascertained imminent actuation of the recuperation unit on the basis of a prescribable level of a recuperation intensity of the recuperation unit during the ascertained imminent actuation of the recuperation unit, generate at least one second parameter denoting the ascertained probable profile of the speed of the vehicle during the ascertained imminent actuation of the recuperation unit, determine a probable braking path for the vehicle during the ascertained imminent actuation of the recuperation unit on the basis of the prescribable level of the recuperation intensity of the recuperation unit during the ascertained imminent actuation of the recuperation unit;

generate at least one third parameter, denoting the ascertained probable braking path of the vehicle during the ascertained imminent actuation of the recuperation unit; and displaying the at least one second parameter and the at least one third parameter with the output apparatus.

13. A driver assistance system for a vehicle, the system comprising:

an output apparatus to output driving information, a computation unit, and a computer program product including a non-transitory computer-readable medium and program code stored on the computer-readable medium, when executed on the computation unit, instructs the computation unit to:

determine at least one first parameter denoting possible imminent actuation of the recuperation unit, evaluate whether actuation of the recuperation unit is imminent, on the basis of the at least one ascertained first parameter, if it is ascertained that actuation of the recuperation unit is imminent, calculate a probable profile for a speed of the vehicle during the ascertained imminent actuation of the recuperation unit on the basis of a prescribable level of a recuperation intensity of the recuperation unit during the ascertained imminent actuation of the recuperation unit, generate at least one second parameter denoting the ascertained probable profile of the speed of the vehicle during the ascertained imminent actuation of the recuperation unit, determine a probable braking path for the vehicle during the ascertained imminent actuation of the recuperation unit on the basis of the prescribable level of the recuperation intensity of the recuperation unit during the ascertained imminent actuation of the recuperation unit;

generate at least one third parameter, denoting the ascertained probable braking path of the vehicle during the ascertained imminent actuation of the recuperation unit; and displaying the at least one second parameter and the at least one third parameter with the output apparatus.

14. The driver assistance system as claimed in claim 13, wherein the output apparatus includes a head-up display.

* * * * *